US 7,132,999 B2
Nov. 7, 2006

(12) United States Patent
Yamagajo et al.

(54) MEANDER LINE ANTENNA

(75) Inventors: Takashi Yamagajo, Kawasaki (JP); Toru Maniwa, Kawasaki (JP); Manabu Kai, Kawasaki (JP); Shunji Baba, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 11/159,311

(22) Filed: Jun. 23, 2005

(65) Prior Publication Data
US 2006/0170607 A1 Aug. 3, 2006

(30) Foreign Application Priority Data
Feb. 1, 2005 (JP) ............... 2005-024726

(51) Int. Cl.
*H01Q 1/36* (2006.01)
*H01Q 9/16* (2006.01)

(52) U.S. Cl. ...................... 343/895; 343/806

(58) Field of Classification Search ........ 343/873, 343/806, 747, 895
See application file for complete search history.

(56) References Cited

U.S. PATENT DOCUMENTS

| 4,381,566 | A | * | 4/1983 | Kane .................. 455/193.3 |
| 6,417,816 | B1 | * | 7/2002 | Sadler et al. ............ 343/795 |
| 6,653,986 | B1 | * | 11/2003 | Watada et al. ........... 343/895 |
| 2002/0003496 | A1 | | 1/2002 | Brady et al. ......... 343/700 MS |
| 2002/0190903 | A1 | | 12/2002 | Watada et al. ....... 343/700 MS |

FOREIGN PATENT DOCUMENTS

| JP | 2001-119224 | 4/2001 |
| JP | 2001-217631 | 8/2001 |
| JP | 2002-330018 | 11/2002 |
| JP | 2003-224415 | 8/2003 |
| JP | 2004-032102 | 1/2004 |

OTHER PUBLICATIONS

M. Takiguchi, et al., "Input Impedance Increase of a Very Small Meander Line Antenna," IEEE Antennas and Propagation Society International Symposium 2003 Digest. APS. Columbus, Ohio. Jun. 22-27, 2003, New York, New York: *IEEE*, U.S. vol. 4 of 4, Jun. 22, 2003, pp. 856-859.
M. Takiguchi, et al., "Radiation and Ohmic Resistances in Very Small Meander Line Antennas of Less than 0.1 Wavelength," The Institute of Electronics, Information and Communication Engineers, *IEICE Transaction B*, vol. J87-B, No. 9, Sep. 2004, pp. 1336-1345.

* cited by examiner

*Primary Examiner*—Shih-Chao Chen
(74) *Attorney, Agent, or Firm*—Bingham McCutchen LLP

(57) ABSTRACT

A meander line antenna formed by folding a conductive pattern of a folded dipole antenna in the shape of meander is disclosed. The basic structure of the meander line antenna includes a bottom half section formed by a folded conductive pattern, and a feeding point arranged approximately at the center of the folded conductive pattern for mounting an IC chip, a top half section consisting of a folded conductive pattern shaped like the bottom half section, a coarse tuning section consisting of two or more short circuit conductive patterns for coarse tuning that connects countering conductive patterns of either or both of the bottom half section and the top half section at a predetermined interval, and a fine-tuning section consisting of two or more short circuit conductive patterns for fine tuning that connect countering conductive patterns of the top half section, the countering conductive patterns being located at a position that counters the feeding point, at a predetermined interval.

6 Claims, 20 Drawing Sheets

|  | A | B | C | D | E |
|---|---|---|---|---|---|
| Z[Ω] | 4.974+168.743i | 5.024+168.855i | 5.084+168.979i | 5.15+169.098i | 5.217+169.178i |
| Y[mS] | 0.175−5.921i | 0.176−5.917i | 1.779−5.912i | 1.779−5.908i | 1.821−5.905i |
| C[pF] | 1.047067 | 1.046356 | 1.045567 | 1.044808 | 1.04429 |

MEANDER LINE ANTENNA

BACKGROUND OF THE INVENTION

1. Field of the Invention

The present invention relates to a meander line antenna that is constituted by a folded conductive pattern, and adjustable to a desired electrical property.

2. Description of the Related Art

Various flat antennas are proposed for applying to an IC tag (Integrated Circuit Tag), an RF-ID tag (Radio Frequency Identification Tag), and the like, where a meander line antenna is one of the kinds. Various structures of the meander line antenna are proposed, an example being a folded dipole antenna conductive pattern formed in the shape of a zigzag.

An example of a method of manufacturing the meander line antenna that consists of one or more layers of a conductive pattern is known, wherein a meander-like conductive pattern is formed on or in a dielectric substrate and a magnetic substance substrate, the pattern is cut so that a desired antenna property may be acquired, and calcination is performed on the substrate, (for example, Patent Reference 1). Further, according to another known method, a conductive pattern in the shape of a meander serving as a feed radiation electrode, a conductive pattern in the shape of a meander serving as a non-feed radiation electrode, and a conductive pattern for in-series inductance adjustment are formed on a dielectric substrate, wherein the resonance frequency is adjusted by partially removing the conductive pattern for in-series inductance adjustment (for example, Patent Reference 2).

Further, a meander line antenna, a resonance frequency of which is adjustable, is disclosed, wherein the meander line antenna has shorting conductors at two or more places between countering lines of a part of the meander-like conductive pattern. There, the resonance frequency is lowered by selecting cutting points of the shorting conductors; and the resonance frequency is made higher by short-connecting between points of countering lines, such shorting points being properly chosen (for example, Patent Reference 3). Further, a meander antenna that is sealed by dielectrics except for the feeding point of the antenna is known, wherein the resonance frequency is adjusted by selectively removing two or more short circuit sections (for example, Patent Reference 4).

Further, characteristics measurements and simulations are conducted about a meander line antenna applicable to IC tags, and the like, wherein the length of the meander line antenna is set between 0.025 and 0.1 wavelength at 700 MHz, and parameters are width W, length L, line width d, line pitch s, the number of folding times N, and the like of the target antenna (for example, Non-Patent Reference 1).

[Patent Reference 1] JPA 2001-119224

[Patent Reference 2] JPA 2001-217631

[Patent Reference 3] JPA 2002-330018

[Patent Reference 4] JPA 2004-32102

[Non-Patent Reference 1] "Radiation and Ohmic Resistances in Very Small Meander Line Antennas of Less than 0.1 Wavelength", Masato Takiguchi and Yoshihide Yamada, The Institute of Electronics, Information and Communication Engineers, IEICE Transaction B, Vol. J87-B No. 9, pp 1336–1345, September 2004.

DESCRIPTION OF THE INVENTION

PROBLEM(S) TO BE SOLVED BY THE INVENTION

A meander line antenna is a plane type antenna, and can be produced in large quantity using printed-circuit technology applied to manufacturing various kinds of printed circuit boards. However, the property of the antenna is greatly influenced by operating environment conditions, and electrical properties such as the dielectric constant of the substrate serving as a card on which the meander line antenna is installed. For this reason, a problem is that design changes in the antenna length, etc., and trial productions have to be repeated until a desired property adequate for place of use corresponding to the electrical property of the substrate of the meander line antenna is acquired. Further, at present, a band between 860 and 960 MHz, and another band in a 2.45 GHz region are available for the RF-ID tags. Therefore, in order to obtain a meander line antenna applicable to two or more frequency bands such as described above, the problem of having to repeat the design changes and trial productions for each of the bands is more serious.

SUMMARY OF THE INVENTION

It is a general object of the present invention to provide a meander line antenna that substantially obviates one or more of the problems caused by the limitations and disadvantages of the related art. Specifically, the present invention aims at offering a meander line antenna that can be coarsely and finely tuned such that desired properties are obtained.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a meander line antenna particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

MEANS FOR SOLVING THE PROBLEM

The present invention provides a meander line antenna, the basic structure of which includes a folded conductive pattern of a dipole antenna in the shape of a meander; a bottom half section consisting of a folded conductive pattern that has a feeding point arranged approximately at the center thereof; a top half section consisting of a folded conductive pattern shaped like the bottom half section, except that no feeding point is provided; a coarse tuning section consisting of two or more short circuit conductive patterns for coarse tuning that connect countering conductive patterns of either or both of the bottom half section and the top half section at a predetermined interval; and a fine-tuning section consisting of two or more short circuit conductive patterns for fine tuning that connect countering conductive patterns of the top half section at a position that counters the feeding point at a predetermined interval.

Based on the structure described above, a short circuit conductive pattern for coarse tuning can be selected out of the short circuit conductive patterns for coarse tuning of the coarse tuning section, the selected one remaining intact and others being removed; and a short circuit conductive pattern for fine tuning can be selected out of the short circuit conductive patterns for fine tuning of the fine-tuning section, the selected one remaining intact and others being removed.

According to another aspect of the present invention, the basic structure of the meander line antenna includes a bottom half section consisting of a folded conductive pattern, and a feeding point arranged at approximately the center thereof; a top half section consisting of a folded conductive pattern shaped like the bottom half section, except that no feeding point is provided; a coarse tuning section consisting of two or more connection conductive patterns for coarse tuning connecting the bottom half section and the top half section at a predetermined interval; and a fine-tuning section consisting of two or more short circuit conductive patterns for fine tuning that connect countering conductive patterns of the top half section at a position that counters the feeding point at a predetermined interval.

Based on the structure described above, a short circuit conductive pattern for coarse tuning can be selected out of the short circuit conductive patterns for coarse tuning of the coarse tuning section, the selected one remaining intact and others being removed; and a short circuit conductive pattern for fine tuning can be selected out of the short circuit conductive patterns for fine tuning of the fine-tuning section, the selected one remaining intact and others being removed.

According to another aspect of the present invention, the basic structure of the meander line antenna includes a folded conductive pattern of a folded dipole antenna in the shape of a meander, and a feeding point is arranged approximately at the central part thereof, wherein an interval between countering conductive patterns immediately adjacent to the feeding point is made greater than an interval between other countering conductive patterns. The basic structure of the meander line antenna further includes a coarse tuning section consisting of two or more short circuit conductive patterns for coarse tuning that connect countering conductive patterns at a predetermined interval, and a fine-tuning section consisting of two or more short circuit conductive patterns for fine tuning that connect countering conductive patterns at a position countering the feeding point at a predetermined interval.

Based on the structure described above, a short circuit conductive pattern for coarse tuning can be selected out of the short circuit conductive patterns for coarse tuning of the coarse tuning section, the selected one remaining intact and others being removed such that a desired resonance frequency is obtained; and a short circuit conductive pattern for fine tuning can be selected out of the short circuit conductive patterns for fine tuning of the fine-tuning section, the selected one remaining intact and others being removed such that desired impedance is obtained.

EFFECT OF THE INVENTION

The basic structures as described above are produced in large quantities. Then, coarse tuning is carried out by the coarse tuning section, and fine tuning is carried out by the fine-tuning section so that a desired electrical property of each meander line antenna is obtained. Since what is necessary is just to remove unnecessary conductive patterns by a cutter, a punch, etc., in order to obtain a conductive pattern that provides the desired property, repetition of design changes and trial productions is dispensed with, and the meander line antenna can be supplied at less cost, time, and effort.

DESCRIPTION OF THE PREFERRED EMBODIMENTS

In the following, embodiments of the present invention are described with reference to the accompanying drawings.

Figure 1:
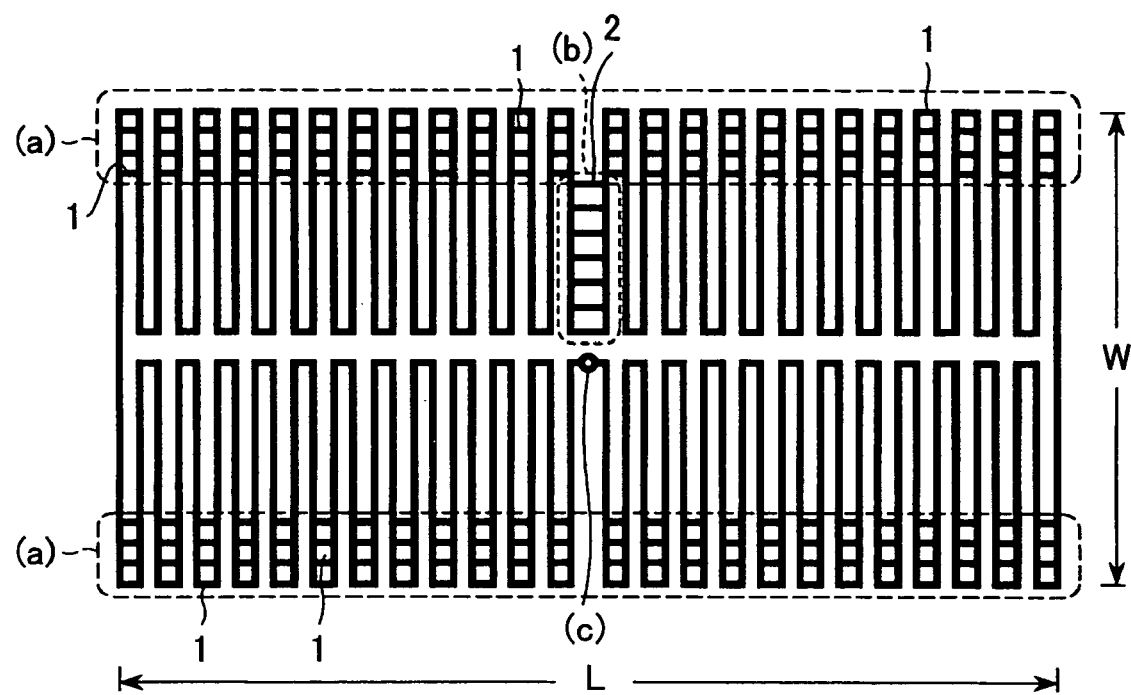
FIG. 1 is a pattern view according to Embodiment 1 of the present invention.

The meander line antenna according to the present invention is constituted by a folded conductive pattern of a folded dipole antenna in the shape of a meander as shown in FIG. 1. The meander line antenna includes a bottom half section consisting of a folded conductive pattern, and a feeding point (c) approximately at the central part thereof, and a top half section consisting of a folded conductive pattern shaped like the bottom half section. The meander line antenna further includes a coarse tuning section (a) consisting of two or more short circuit conductive patterns 1 for coarse tuning that connect countering conductive patterns of either or both of the bottom half section and the top half section at a predetermined interval, and a fine-tuning section (b) consisting of two or more short circuit conductive patterns 2 for fine tuning that connect countering conductive patterns of the top half section at a position that counters the feeding point (c) at a predetermined interval.

[Embodiment 1]

FIG. 1 is a pattern view showing the basic structure of the meander line folded dipole antenna according to Embodiment 1 of the present invention. The top half section and the bottom half section of the basic structure are approximately symmetric, and the structure includes coarse tuning sections (a), a fine-tuning section (b), and a feeding point (c) to which an IC chip is mounted and connected. For example, the length L is set at 48 mm, the width W is set at 22.5 mm, the width of the conductive patterns is set at 0.25 mm, the intervals between the countering conductive patterns of the fine-tuning section (b) and between the countering conductive patterns at the feeding point (c) are set at 1.5 mm, and the intervals between other countering conductive patterns are set at 0.75 mm. Further, the interval between the top half section and the bottom half section is set at 1.5 mm, for example. Further, the coarse tuning sections (a) formed in the top half section and the bottom half section are constituted by short circuit conductive patterns 1 for coarse tuning that make short circuit connections between countering conductive patterns at two or more places, and the fine-tuning section (b) is constituted by short circuit conductive patterns 2 for fine tuning that make short circuit connections at two or more places between countering conductive patterns of the top half section that counters the feeding point (c). Here, the intervals between the countering conductive patterns in the fine-tuning section (b) can be selected in consideration of a fine-tuning step, an adjustment process, etc. Further, the interval between the countering conductive patterns at the feeding point (c) can be selected in consideration of IC chip mounting, etc.

Figure 2A:
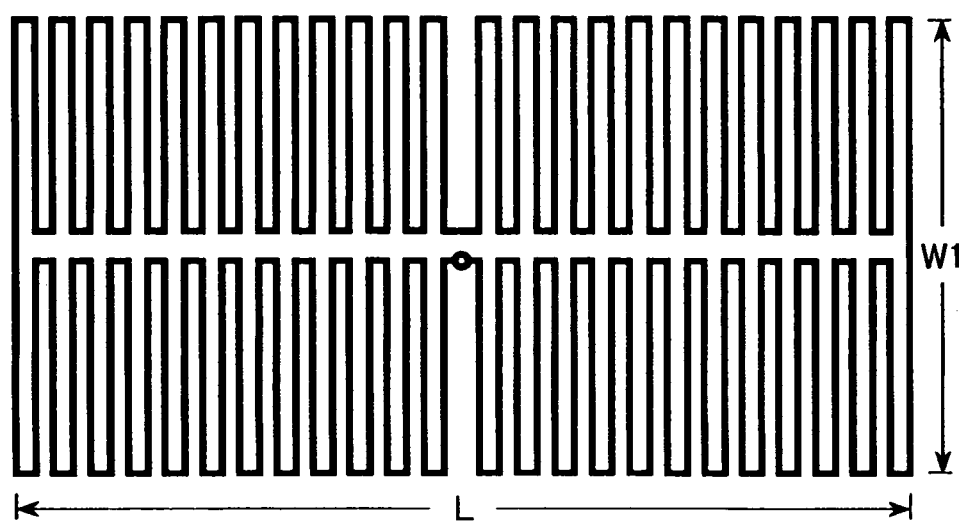
FIGS. 2A, 2B, 2C and 2D are pattern views according to Embodiment 1 of the present invention.
Figure 2B:
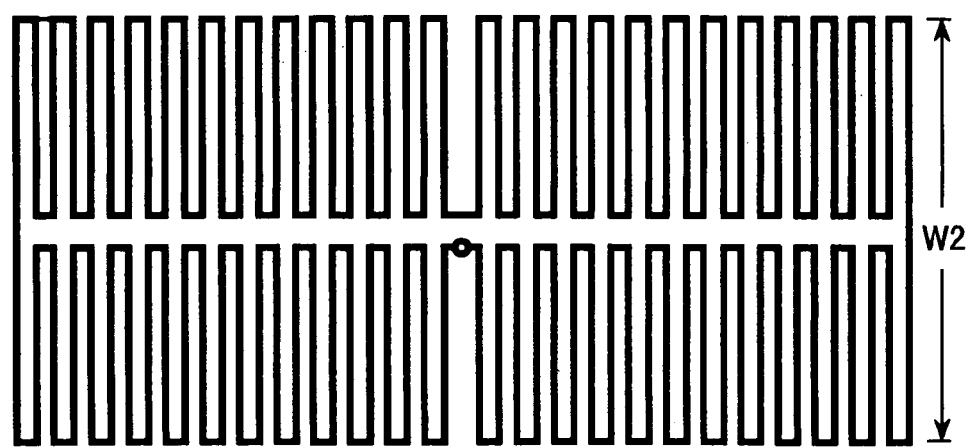
Figure 2C:
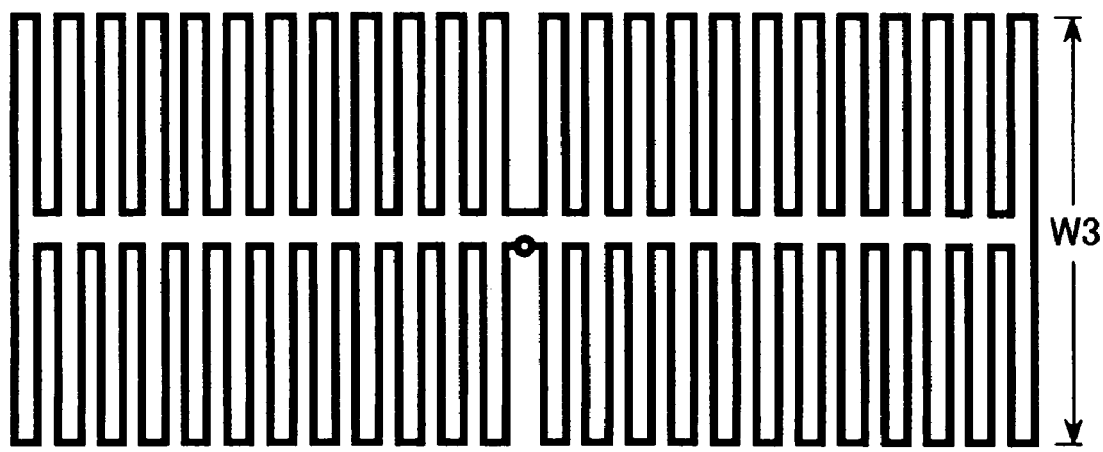
Figure 2D:
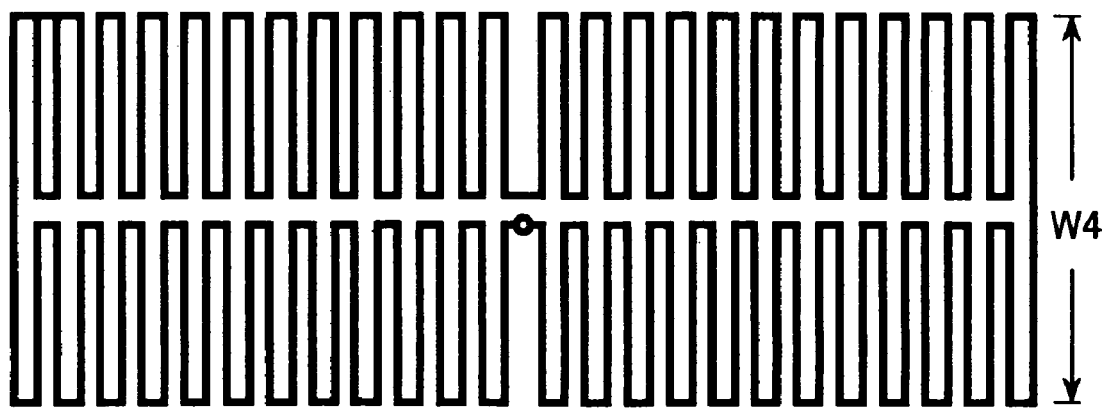

By cutting off short circuit conductive patterns 1 other than specific ones, meander line antennas having different widths are obtained. Where short circuit conductive patterns 1 and 2 are cut, they are cut by a cutter, a punch, and the like. Specifically, by cutting off the short circuit conductive patterns 1 for coarse tuning other than those that are located outer-most in the width directions of the coarse tuning sections (a) of the top half section and the bottom half section of the basic structure, and by cutting off the short circuit conductive patterns 2 for fine tuning other than one that is located innermost in the width directions of the fine-tuning section (b), a meander line antenna having a width W1 (=W) as shown in FIG. 2A is obtained. Here, the length L is the same as that of the basic structure shown in FIG. 1. Next, by cutting off the short circuit conductive patterns for coarse tuning 1 that are located outer-most, third outer-most, and fourth outer-most of the coarse adjustment sections (a), i.e., the second outer-most patterns are left intact, a meander line antenna having a width W2 (<W1) as shown in FIG. 2B is obtained. Here, the fine-tuning section (b) leaves intact the short circuit conductive pattern 2 for fine tuning that is located inner-most, with others being removed, which is the same as shown in FIG. 2A. Next, if the third outer-most short circuit conductive patterns for coarse tuning of the coarse adjustment section (a) are left intact, and other short circuit conductive patterns for coarse tuning are cut off, a meander line antenna having a width W3 (<W2<W1) as shown in FIG. 2C is obtained. Here, also, the fine-tuning section (b) shows the case that is the same as shown in FIG. 2A. Similarly, if the short circuit conductive patterns for coarse tuning located in the outer-most, second outer-most, and third outer-most levels of the coarse tuning sections (a) are removed, i.e., only the fourth outer-most short circuit conductive patterns for coarse tuning are left intact, a meander line antenna having a width W4 (<W3<W2<W1) as shown in FIG. 2D is obtained. Note that L is maintained at 48 mm in these examples.

Figure 3A:
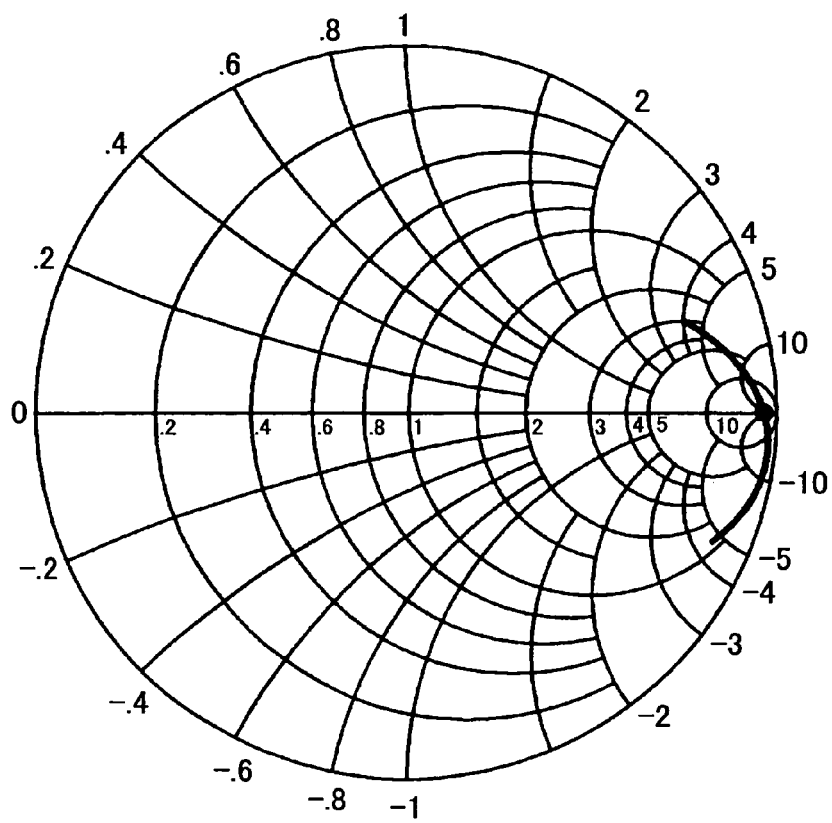
FIGS. 3A, 3B, 3C and 3D are Smith charts according to Embodiment 1 of the present invention.
Figure 3B:
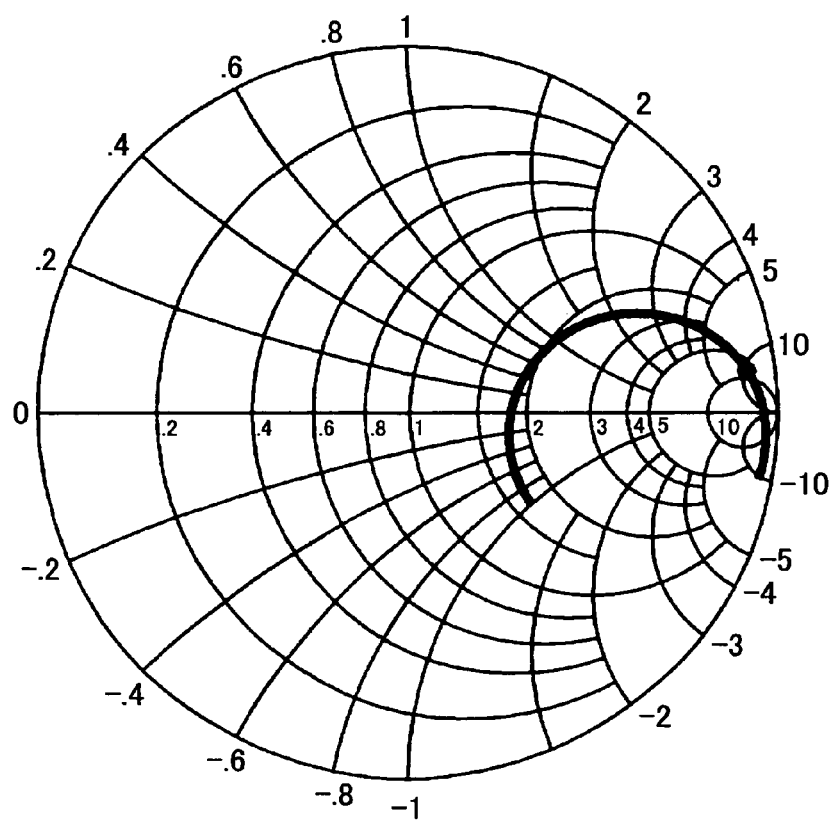
Figure 3C:
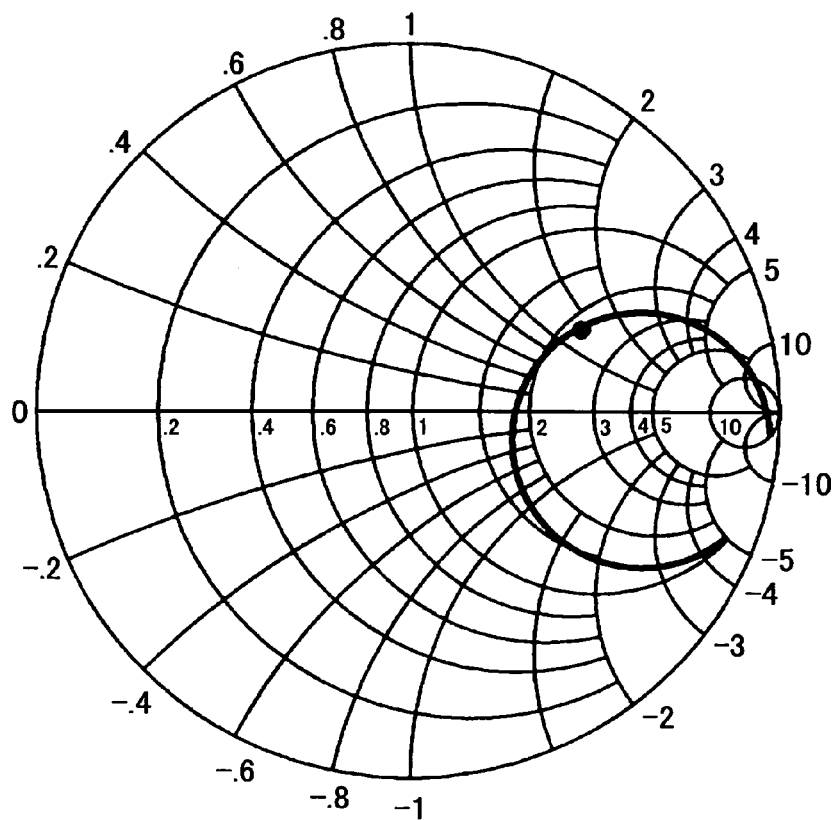
Figure 3D:
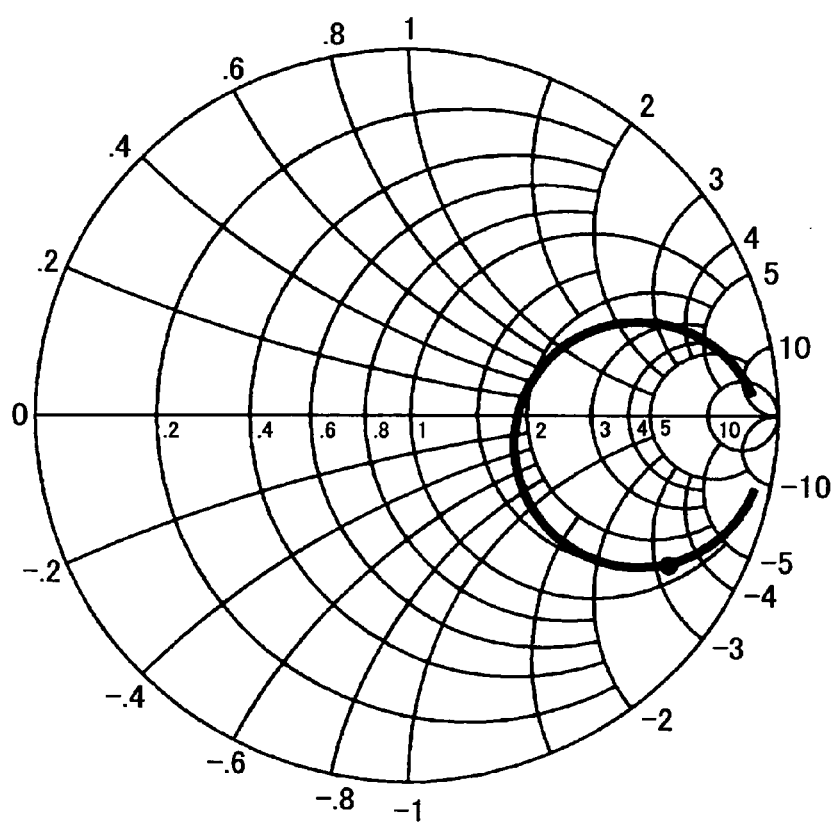

FIGS. 3A, 3B, 3C, and 3D are Smith charts showing the impedance characteristics of the meander line antennas shown in FIGS. 2A, 2B, 2C, and 2D, respectively, in a frequency range between 800 and 1100 MHz, wherein a black dot mark indicates the impedance at 900 MHz. FIG. 3A shows the impedance characteristics of the structure shown in FIG. 2A, where the coarse tuning section (a) is adjusted to W1=W=24.5 mm, which is the same as the basic structure. Further, FIG. 3B shows the impedance characteristics where the coarse tuning section (a) is adjusted to W2=22.5 mm as shown in FIG. 2B. Further, FIG. 3C shows the impedance characteristics where the coarse tuning section (a) is adjusted to W3=20.25 mm as shown in FIG. 2C. Further, FIG. 3D shows the impedance characteristics where the coarse tuning section (a) is adjusted to W4=18.25 mm as shown in FIG. 2D. In addition, adjustment steps can be set up by setting up the interval of the short circuit conductive patterns 1 for coarse tuning. Further, the number of adjustment stages can be set up by the number of the short circuit conductive patterns 1 for coarse tuning.

According to Embodiment 1 as described above, coarse tuning is carried out by removing appropriate short circuit conductive patterns 1 for coarse tuning of the coarse tuning section (a) of the top half section and the bottom half section in a symmetric form. However, it is also possible to remove short circuit conductive patterns 1 in an asymmetric form, which also attains coarse tuning. That is, it is possible to perform coarse tuning by removing the short circuit conductive patterns for coarse tuning of the coarse tuning section (a) of only the top half section or only the bottom half section. Further, it is also possible to remove short circuit conductive patterns 1 for coarse tuning in an alternating manner (such as every other pattern, every third pattern, and so on) in the direction of the length L for either or both the top half section and the bottom half section. In this case, coarse tuning can also be performed by an asymmetric structure for the top half section and the bottom half section. By any one of the coarse tuning methods, coarse tuning of the impedance of the antenna is possible with no degradation of antenna properties. Further, by removing appropriate short circuit conductive patterns for fine tuning of the fine-tuning section (b), the impedance of the antenna can be fine-tuned. In this manner, the meander line antenna with desired impedance can be obtained.

[Embodiment 2]

Figure 4:
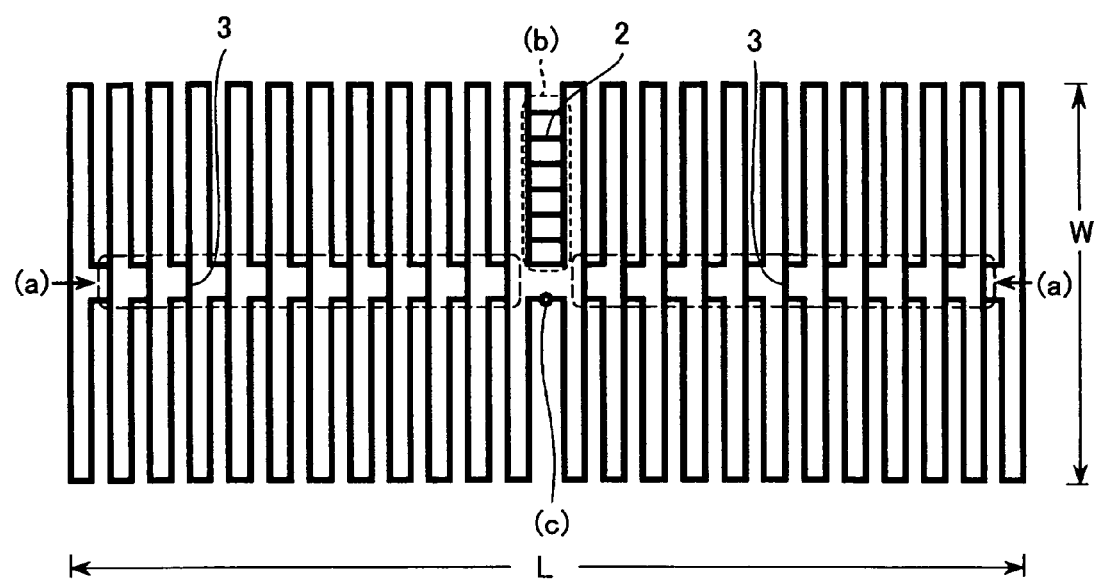
FIG. 4 is a pattern view according to Embodiment 2 of the present invention.

FIG. 4 is a pattern view of Embodiment 2 of the present invention, showing the basic structure formed in an area of a width W and a length L. For example, the dimensions can be set at L=48 mm, W=20 mm, and the width of the conductive pattern at 0.25 mm. According to Embodiment 2, the coarse adjustment section (a) is constituted by connection conductive patterns 3 for coarse tuning that connect the top half section and the bottom half section at two or more places. The fine-tuning section (b) is arranged at the top half section that counters the feeding point (c), which is the same as shown in FIG. 1. Namely, according to the basic structure, each of the top half section and the bottom half section has 24 folded conductive patterns that are symmetrically arranged in the top half section and the bottom half section except for the position of the feeding point (c) for mounting an IC chip as Embodiment 1 shown in FIG. 1. The interval between the conductive patterns immediately adjacent to the feeding point (c) is made greater than other portions in order to mount the IC chip. The interval between the countering conductive patterns of the top half section that counters the feeding point (c) is also formed wider, and constitutes the fine-tuning section (b) by the short circuit conductive patterns 2 for fine tuning that connect the countering conductive patterns at two or more places. Here, although the coarse adjustment section (a) shows the case wherein every folded section of the top half section and the bottom half section is connected by the connection conductive patterns 3 for coarse tuning, the connection conductive patterns 3 for coarse tuning may be provided every other piece or one for every predetermined number of pieces.

Figure 5A:
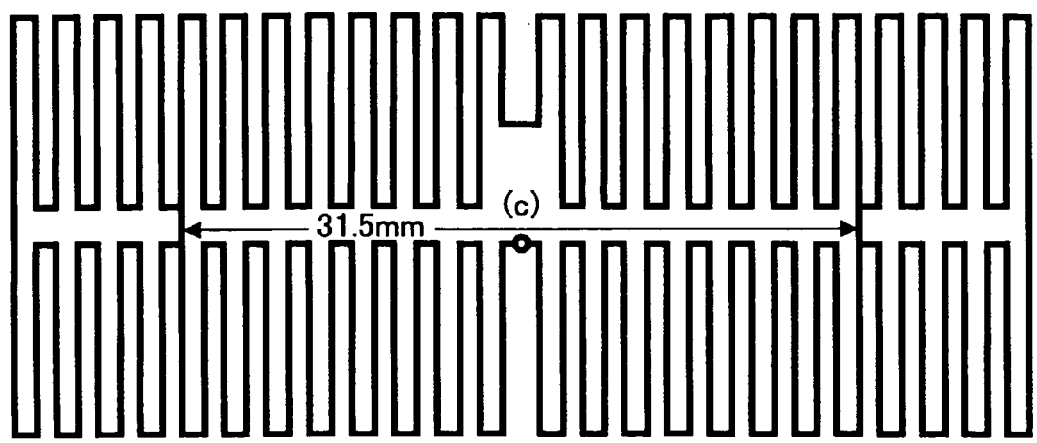
FIGS. 5A, 5B and 5C are pattern views according to Embodiment 2 of the present invention.
Figure 5B:
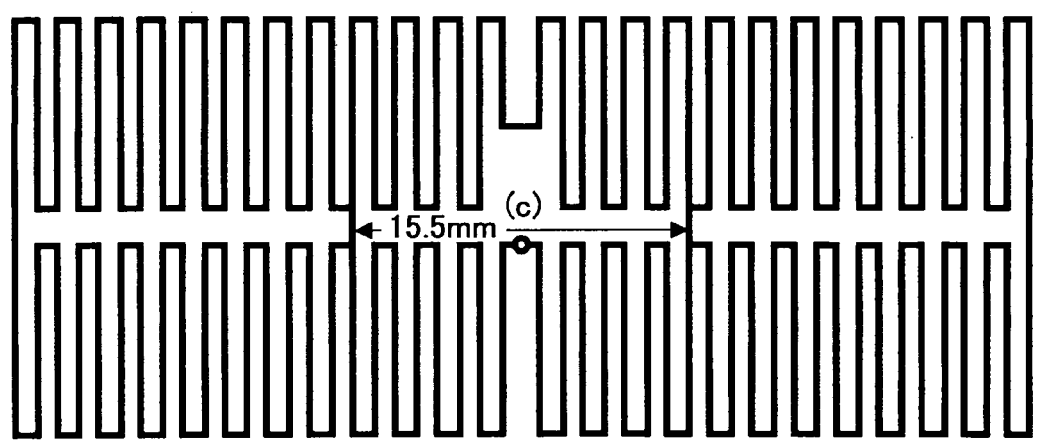
Figure 5C:
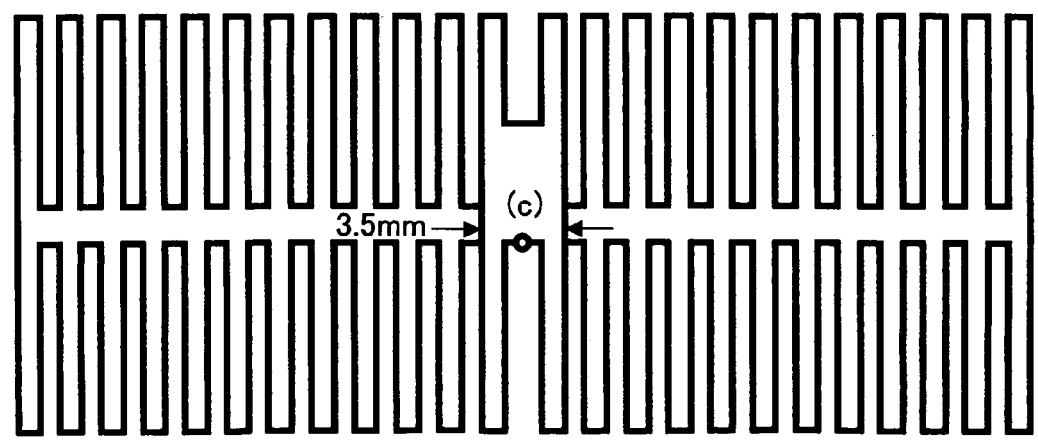

FIGS. 5A, 5B, and 5C show the structures of the meander line antennas that are obtained by selectively removing the connection conductive patterns 3 for coarse tuning that connect the top half section and the bottom half section of the coarse tuning section (a) in FIG. 4. Here, as for the fine-tuning section (b), the fourth short circuit conductive pattern for fine tuning, the "fourth" being counted from the top, is left intact, and other short circuit conductive patterns for fine tuning are removed.

FIG. 5A shows the structure wherein the outer-most and the fifth connection conductive patterns for coarse tuning are left intact, "the fifth" being counted from the respective outer-most connection conductive patterns for coarse tuning, with others being removed. The interval between the fifth connection conductive patterns for coarse tuning is 31.5 mm.

FIG. 5B shows the structure wherein the outer-most and the ninth connection conductive patterns for coarse tuning are left intact with others being removed. Here, the interval between the ninth connection conductive patterns for coarse tuning is 15.5 mm.

FIG. 5C shows the structure wherein the outer-most and the eleventh connection conductive patterns for coarse tuning are left intact with others being removed. The interval between the eleventh connection conductive patterns for coarse tuning is 3.5 mm.

Figure 6A:
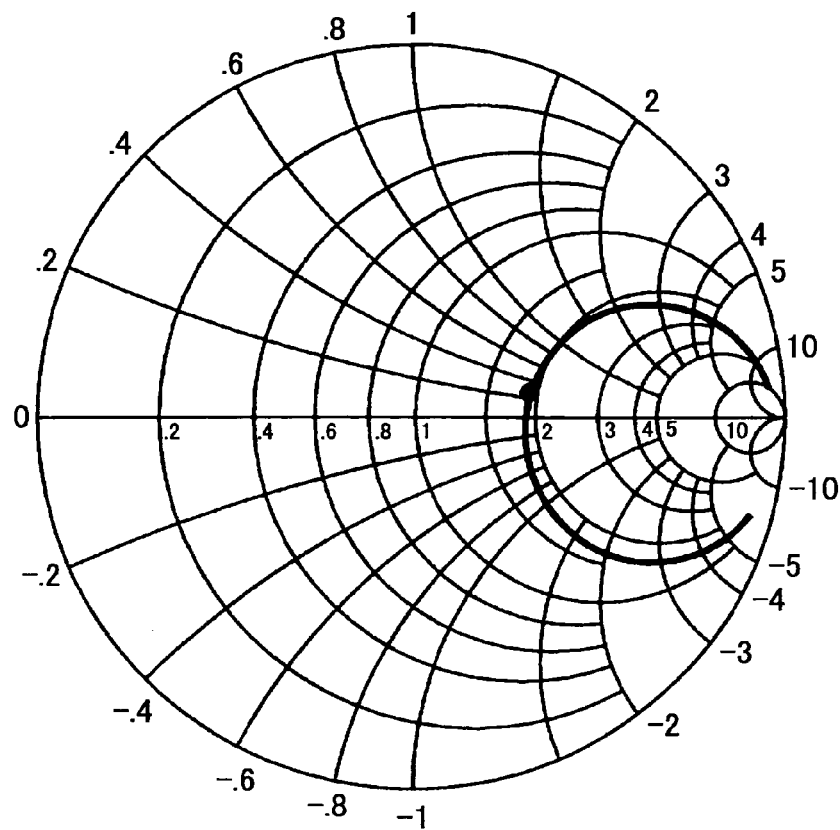
FIGS. 6A, 6B and 6C are Smith charts according to Embodiment 2 of the present invention.
Figure 6B:
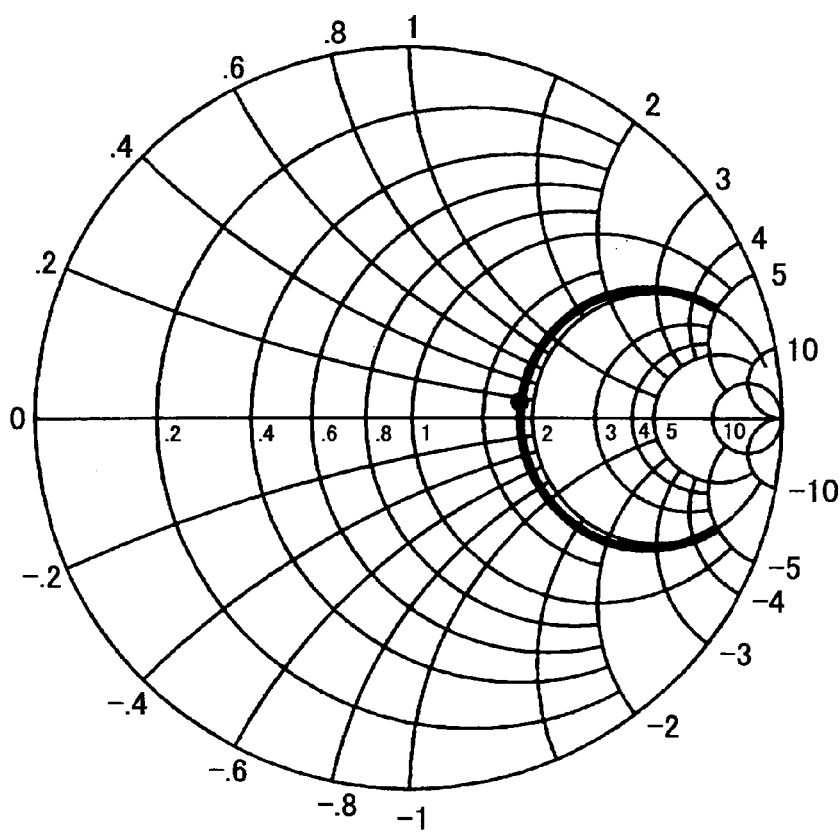
Figure 6C:
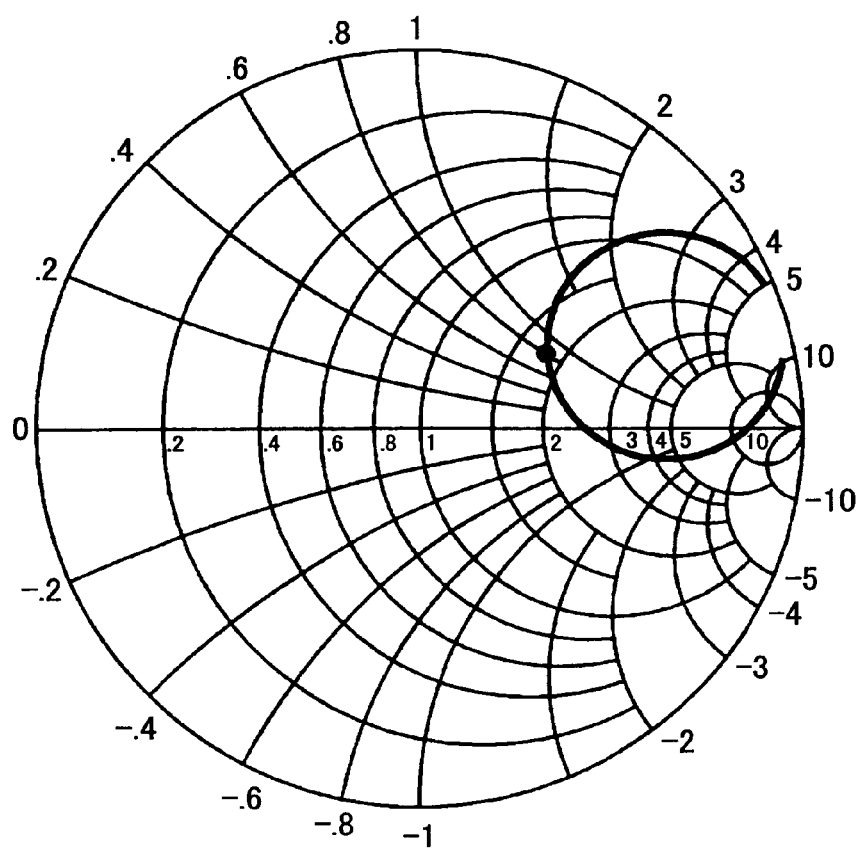

FIGS. 6A, 6B, and 6C are Smith charts showing the impedance characteristics in 800–1100 MHz of the structures shown in FIGS. 5A, 5B, and 5C, respectively. The black dot marks indicate the impedance at 900 MHz. As shown by FIGS. 6A, 6B, and 6C, the impedance of the antenna widely varies by selection of the connection conductive patterns for coarse tuning of the coarse tuning sections (a) that connect the top half section and the bottom half section. Here, as for the fine-tuning section (b), the fourth (counted from the top) short circuit conductive pattern for fine tuning is left intact, with others being removed, for example. The impedance can be finely tuned by choosing the short circuit conductive pattern for fine tuning of the fine-tuning section (b) after coarse tuning.

[Embodiment 3]

The basic structure of Embodiment 3 of the present invention is described with reference to FIG. 7 that is a pattern view having the area of a length L and a width W. The fine-tuning section (b) is formed in the top half section that counters the feeding point (c) with two or more short circuit conductive patterns 2 for fine tuning in the same manner as shown in FIG. 1 and FIG. 4. The feeding point (c) of Embodiment 3 is constituted by broad conductive patterns so that an IC chip may be mounted and connected. The coarse adjustment section (a) of Embodiment 3 is constituted in the bottom half section by two or more short circuit conductive patterns 4 for coarse tuning that are provided between the countering conductive patterns, the interval of which is greater than that of the fine-tuning section (b). For example, dimensions are as follows. W=20 mm, L=48 mm, conductive pattern width =0.25 mm, interval between the countering conductive patterns of the fine-tuning section (b)=1.5 mm, interval between the short circuit conductive patterns 2 for fine tuning=1.75 mm, interval between the countering conductive patterns of the coarse tuning section (a)=9.5 mm, and interval between the short circuit conductive patterns 4 for coarse tuning=1.75 mm.

Figure 7:
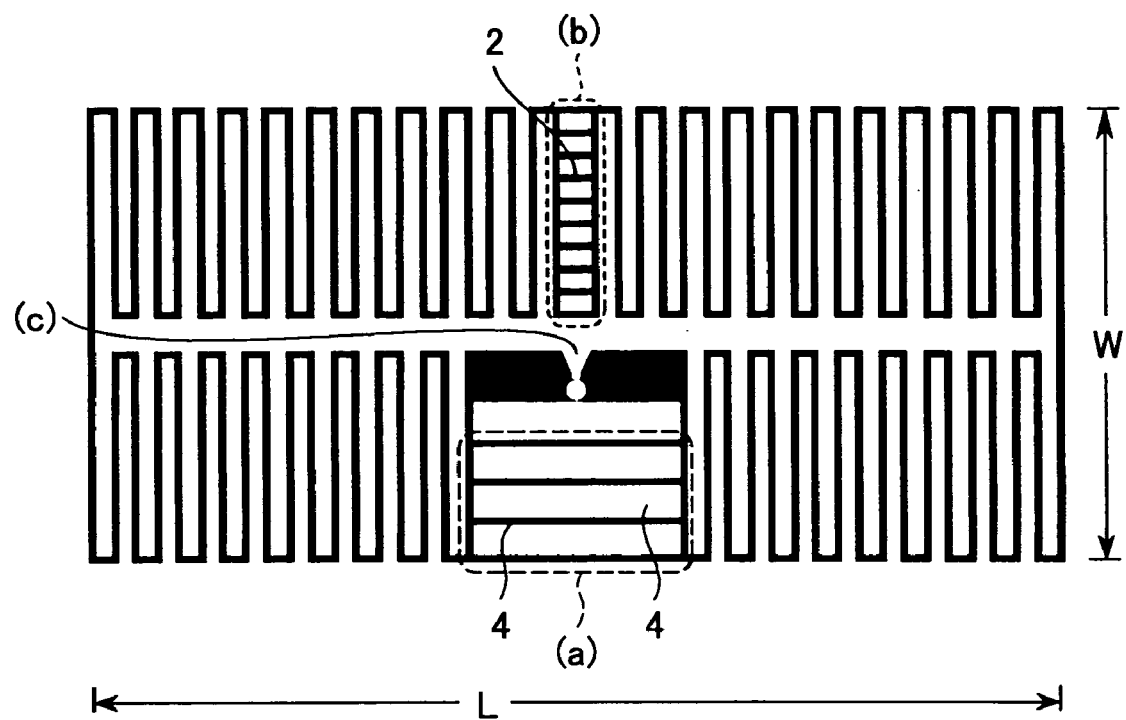
FIG. 7 is a pattern view according to Embodiment 3 of the present invention.

FIGS. 8A, 8B, 8C, and 8D show the structures wherein selected short circuit conductive patterns are left intact, with others being removed with reference to the basic structure shown in FIG. 7. Specifically, FIGS. 8A, 8B, 8C, and 8D show the structures wherein the fourth (counted from the under-most, i.e., the closest to the feeding point (c) at an interval of 1.75 mm), the third (3.5 mm from the feeding point (c)), the second (5.25 mm from the feeding point (c)), and the first (7 mm from the feeding point (c)), respectively, short circuit conductive pattern 4 for coarse tuning is left intact with others being removed in the coarse tuning section (a). As for the short circuit conductive pattern 2 for fine tuning of the fine-tuning section (b), only the bottom short circuit conductive pattern 2 is left intact, with others being removed.

FIGS. 9A, 9B, 9C, and 9D are Smith charts showing the impedance characteristics in 800–1100 MHz of the structures shown in FIGS. 8A, 8B, 8C, and 8D, respectively, and the black dot marks indicate the impedance at 900 MHz. That is, the impedance of the antenna can be widely changed by selection of the short circuit conductive patterns for coarse tuning of the coarse tuning section (a). In addition, for the fine-tuning section (b), the impedance can be finely tuned like Embodiments 1 and 2 by choosing the short circuit conductive pattern for fine tuning after coarse tuning.

Figure 8A:
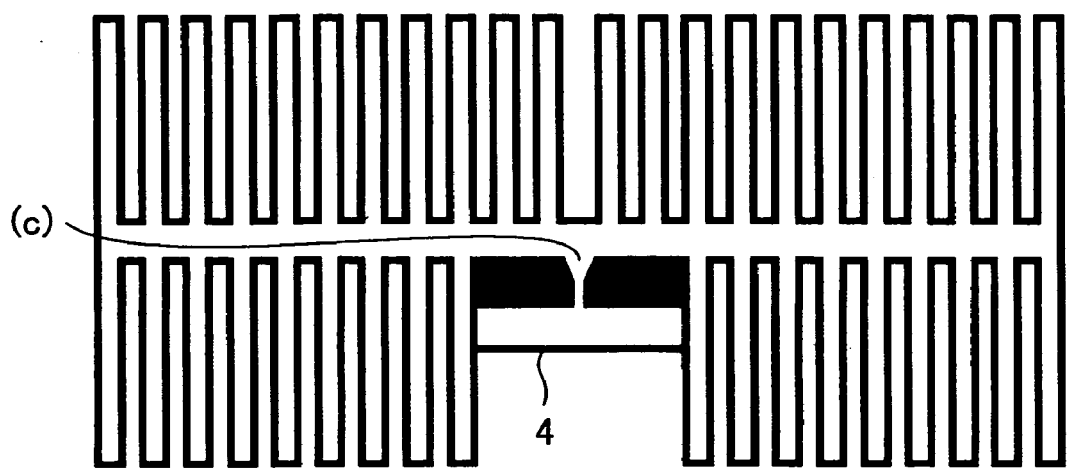
FIGS. 8A, 8B, 8C, and 8D are pattern views according to Embodiment 3 of the present invention.
Figure 8B:
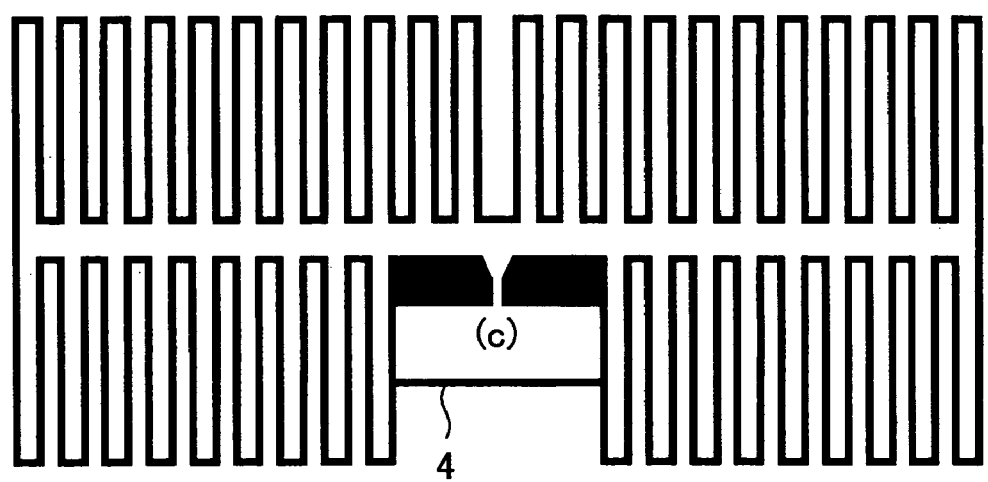
Figure 8C:
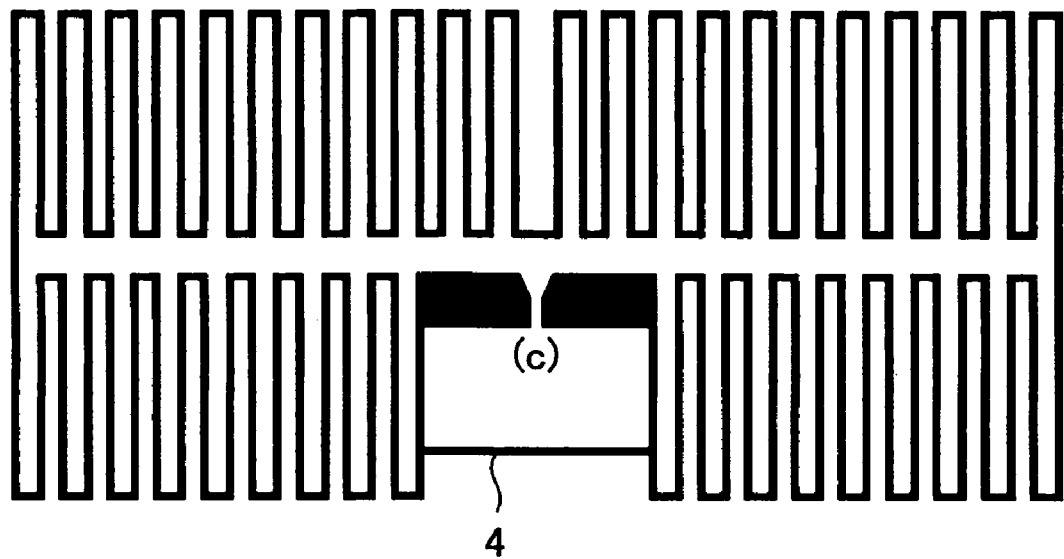
Figure 8D:
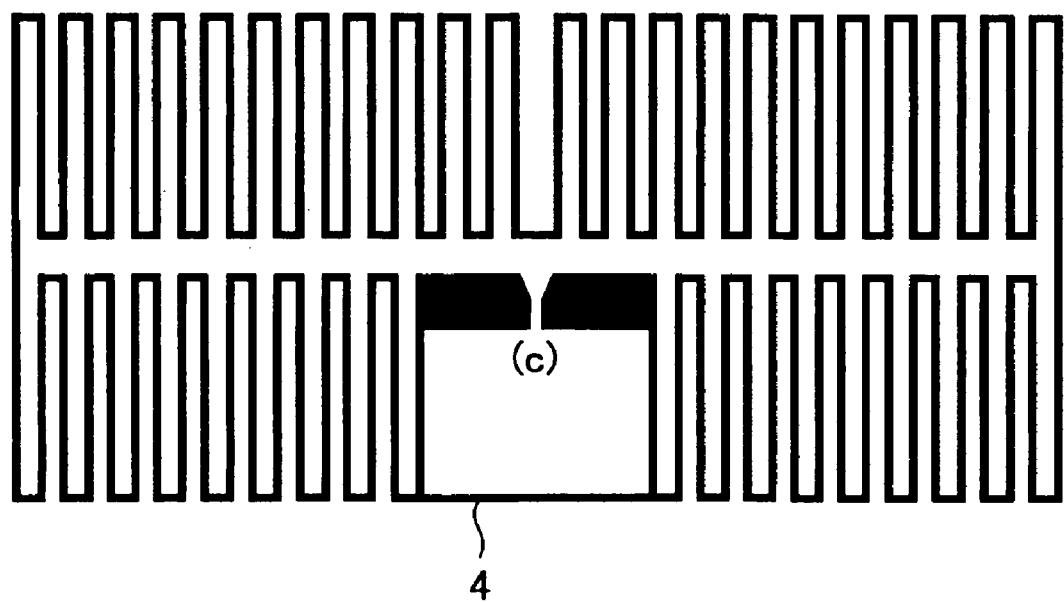
Figure 9A:
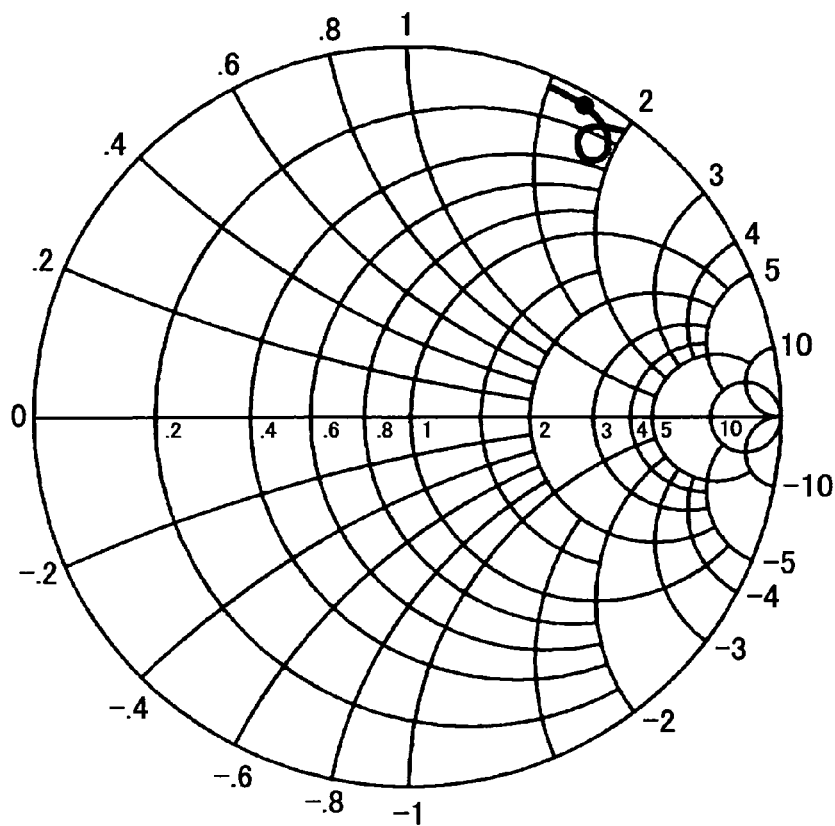
FIGS. 9A, 9B, 9C, and 9D are Smith charts according to Embodiment 3 of the present invention.
Figure 9B:
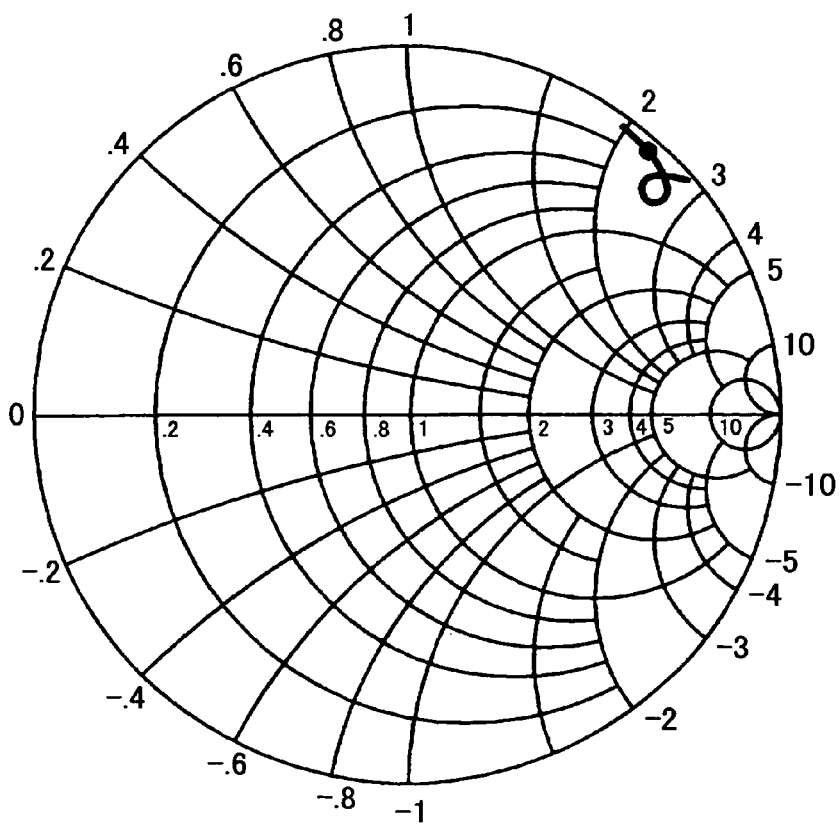
Figure 9C:
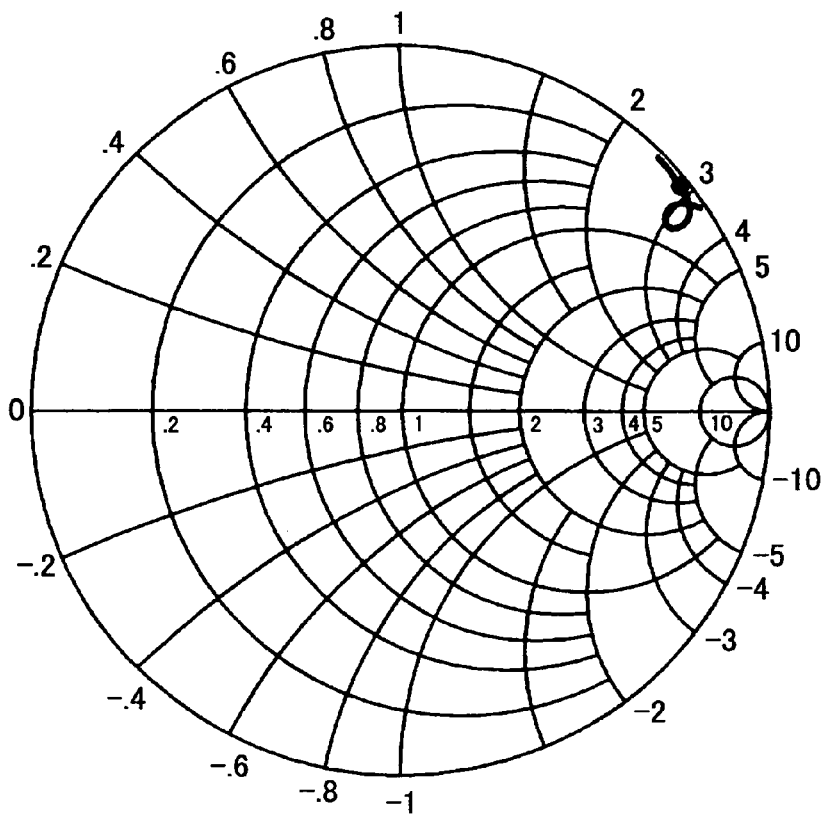
Figure 9D:
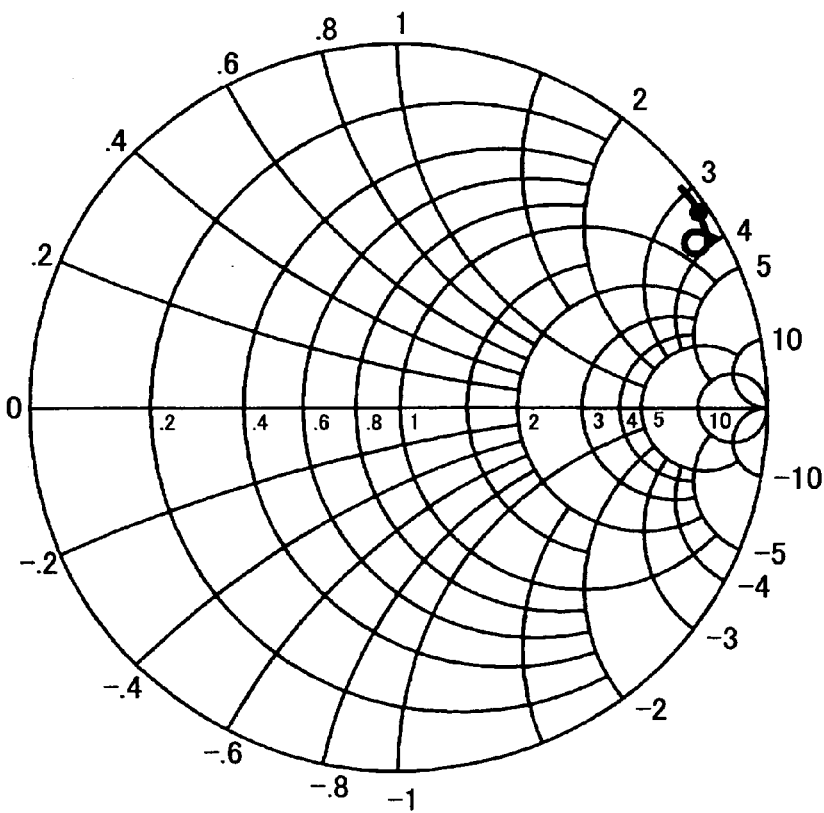
Figure 10A:
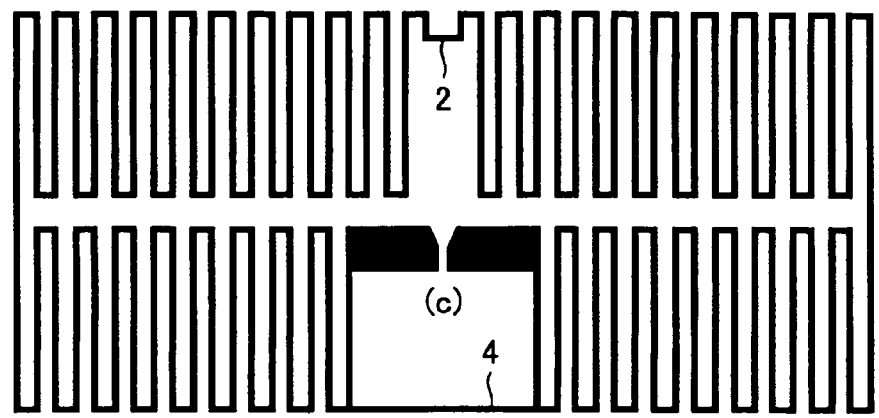
FIGS. 10A, 10B, 10C, 10D, and 10E are pattern views according to Embodiment 3 of the present invention.
Figure 10B:
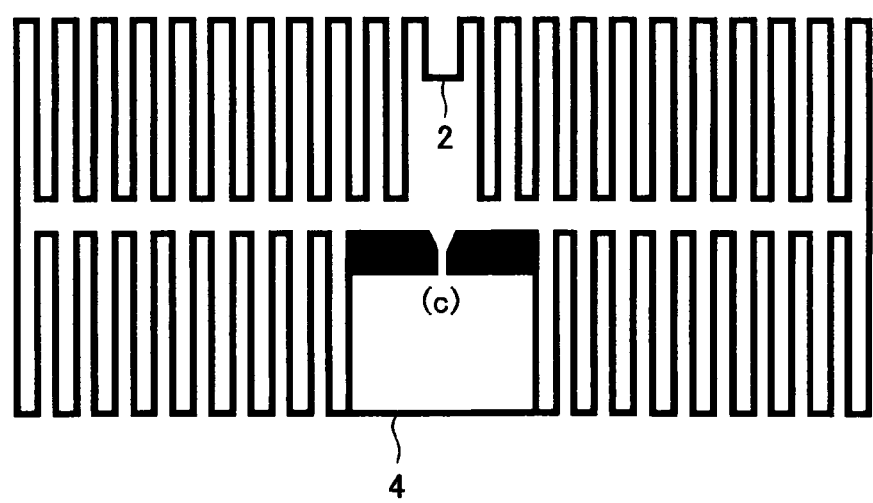
Figure 10C:
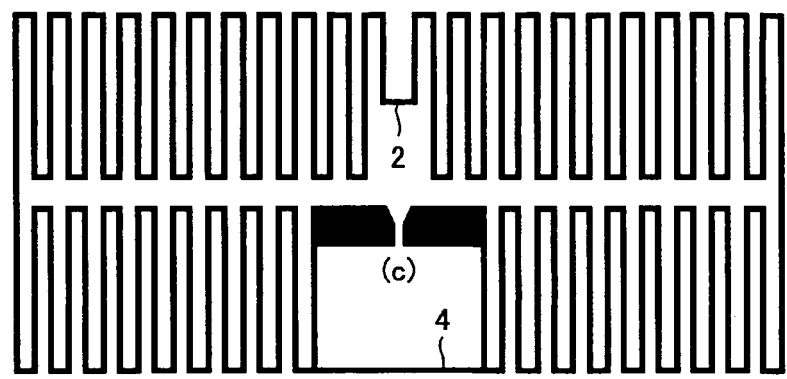
Figure 10D:
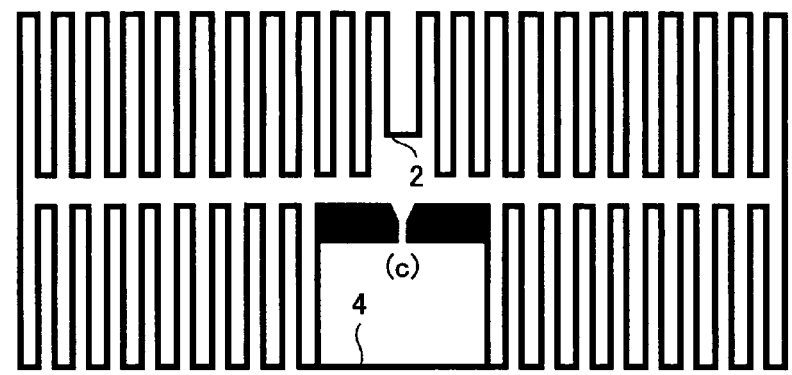
Figure 10E:
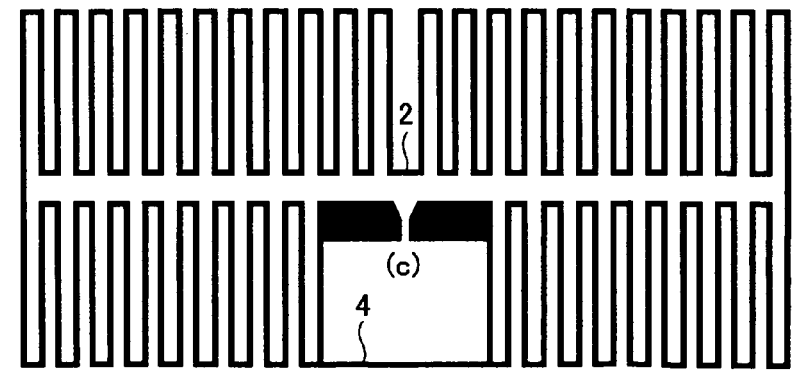
Figure 11A:
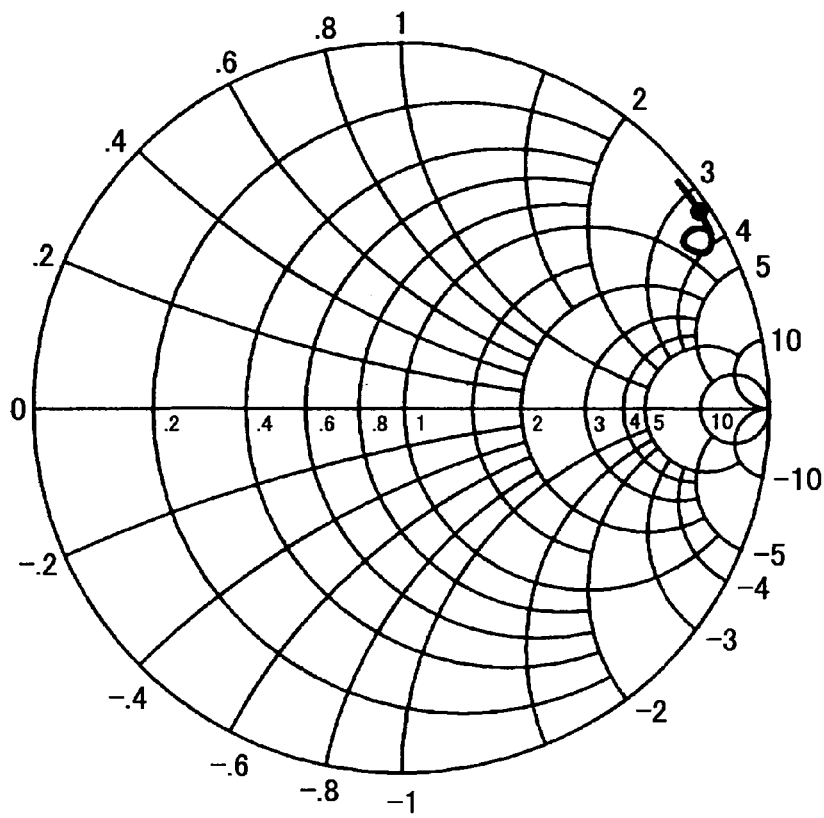
FIGS. 11A, 11B, 11C, 11D, and 11E are Smith charts according to Embodiment 3 of the present invention.
Figure 11B:
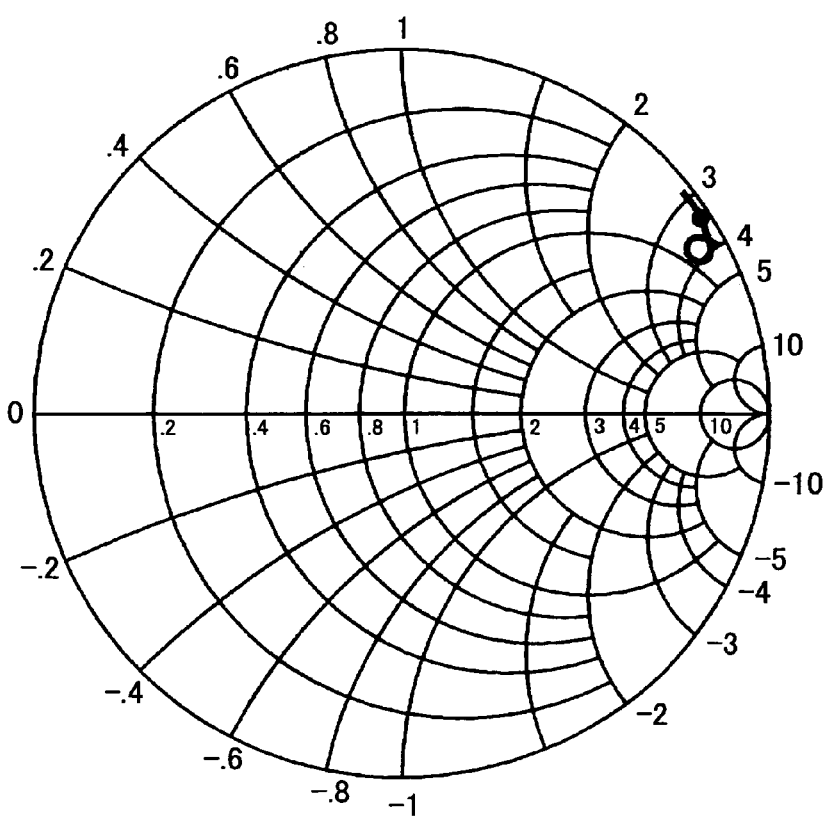
Figure 11C:
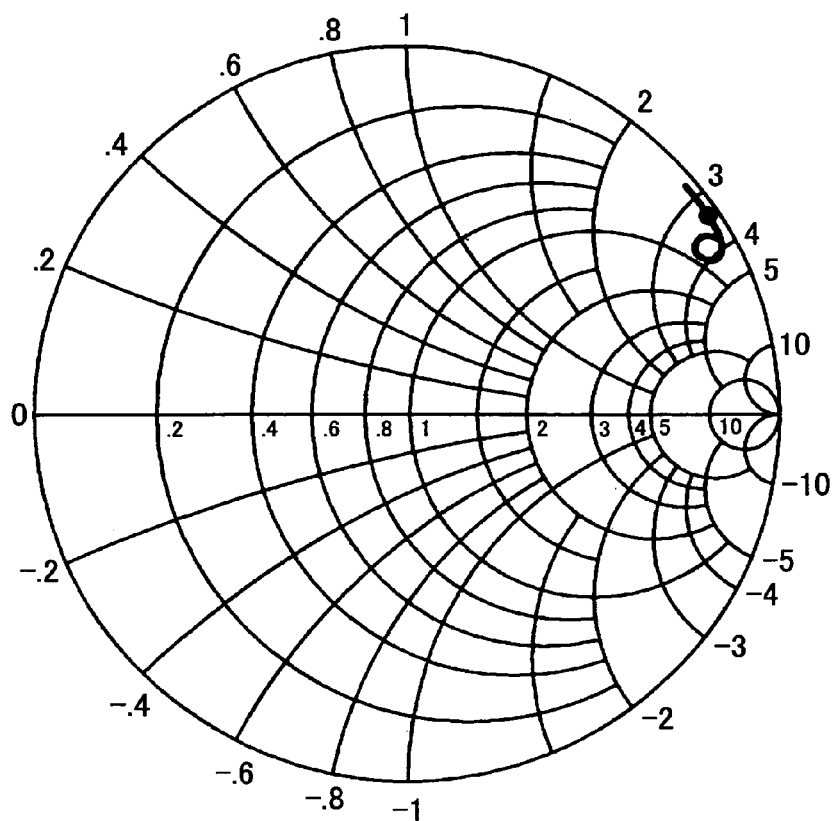
Figure 11D:
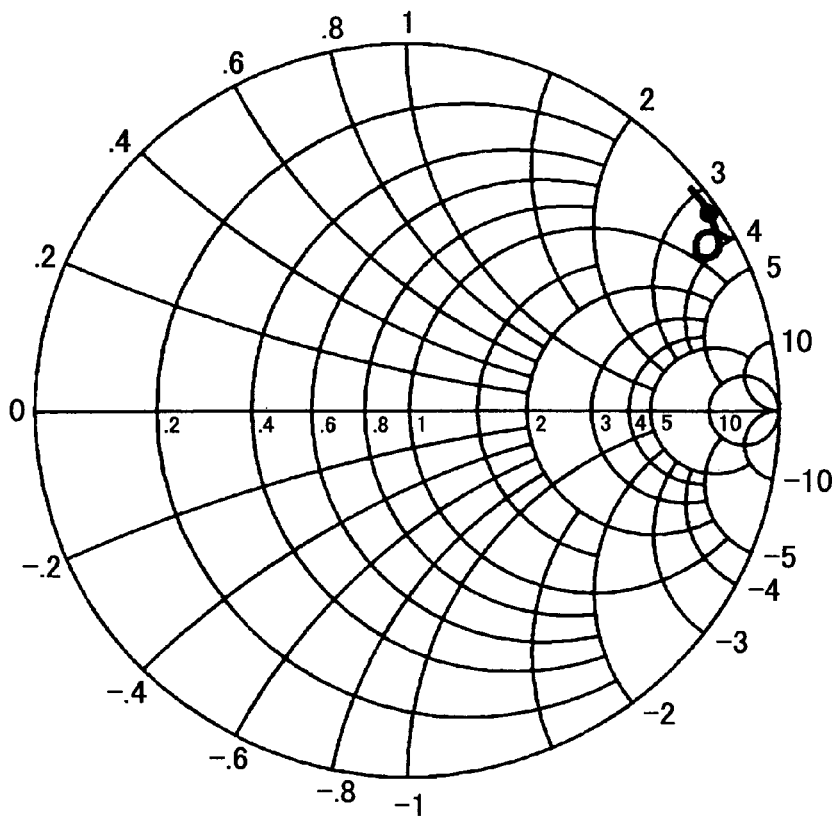
Figure 11E:
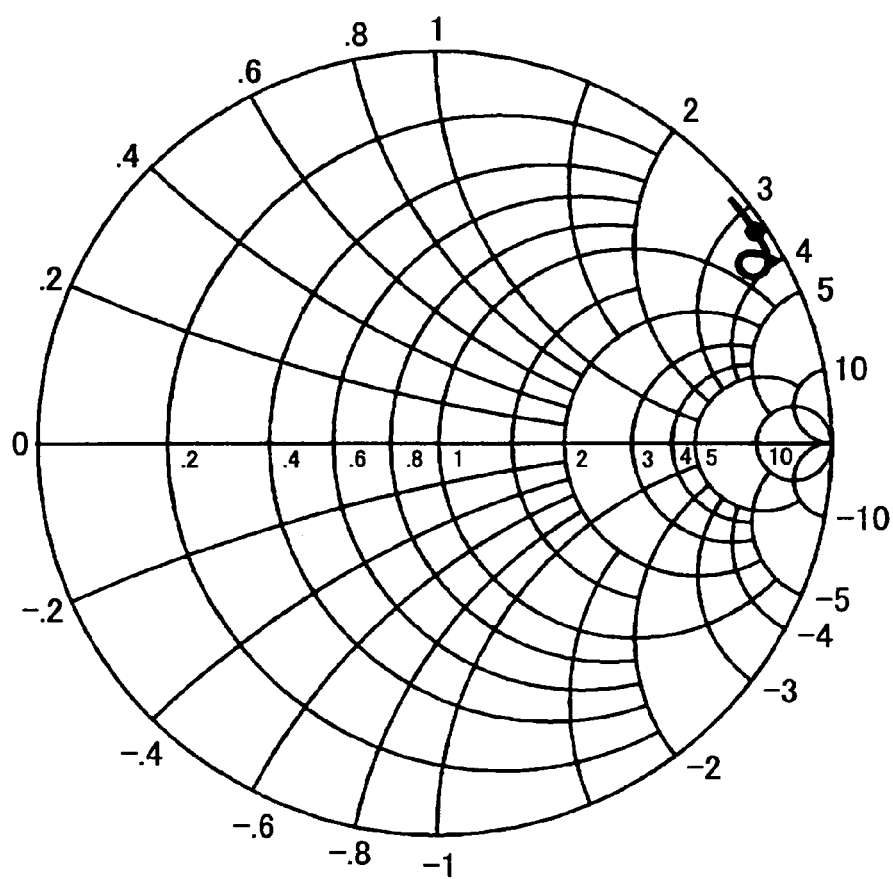

FIGS. 10A, 10B, 10C, 10D, and 10E show the structures wherein the second (1 mm from the top), the fourth (3 mm from the top), the sixth (5 mm from the top), the eighth (7 mm from the top), and the tenth (9 mm from the top), respectively, short circuit conductive patterns 2 for fine tuning of the fine-tuning section (b) are left intact with others being removed with reference to the basic structure shown in FIG. 7. Here, as for coarse tuning, the bottom short circuit conductive pattern 4 for coarse tuning of the coarse tuning section (a) is left intact with others being removed. The fine tuning is carried out after the coarse tuning as shown in FIG. 8D.

FIGS. 11A, 11B, 11C, 11D, and 11E are Smith charts showing the impedance characteristics of the antenna having the structures shown in FIGS. 10A, 10B, 10C, 10D, and 10E, respectively, and the black dot marks indicate the impedance at 900 MHz. As shown by the Smith charts, fine tuning that cannot be visible on the charts is possible.

Figures 12A, 12B:
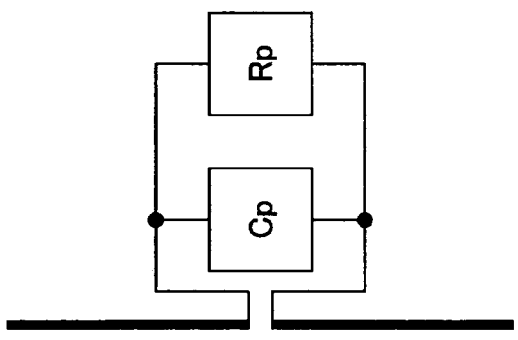
FIG. 12A is a table for explaining impedances by fine tuning according to Embodiment 3 of the present invention.
FIG. 12B is a block diagram representing an equivalent circuit of an antenna and an IC chip.

FIG. 12A is a table that summarizes the impedance Z [Ω] at 900 MHz, admittance Y [mS], and parallel capacity C [pF] of the structures shown in FIGS. 10A, 10B, 10C, 10D, and 10E. Here, the sign "i" represents the imaginary part of the impedance Z and admittance Y. FIG. 12B shows the equivalent circuit of the antenna and IC chip, wherein the IC chip contains a resistance component Rp and a capacity component Cp. Impedance matching is carried out such that a resistance component of the impedance Z of the antenna is made equal to the resistance component Rp of the IC chip, and impedance of an inductance component of the impedance Z of the antenna is made equal to impedance of the capacity component Cp of the IC chip.

Although it is hardly visible in the Smith charts of FIGS. 11A, 11B, 11C, 11D, and 11E, minute changes are as shown in the table of FIG. 12A. Specifically, the capacity component Cp can be finely tuned in steps of about 0.001 pF. In addition, the fine tuning carried out by Embodiment 3 is also applicable to Embodiments 1 and 2.

Further, the present invention is not limited to the Embodiments, but variations and modifications may be made without departing from the scope of the present invention.

The present application is based on Japanese Priority Application No. 2005-024726 filed on Feb. 1, 2005 with the Japanese Patent Office, the entire contents of that are hereby incorporated by reference.

What is claimed is:

1. A meander line antenna formed by folding a conductive pattern of a folded dipole antenna in the shape of a meander, having a basic structure comprising:
    a bottom half section consisting of a folded conductive pattern, and a feeding point arranged approximately at the center of the folded conductive pattern;
    a top half section consisting of a folded conductive pattern shaped like the bottom half section;
    a coarse tuning section consisting of a plurality of short circuit conductive patterns for coarse tuning that connect countering conductive patterns of either or both of the bottom half section and the top half section at a predetermined interval; and
    a fine-tuning section consisting of a plurality of short circuit conductive patterns for fine tuning that connect countering conductive patterns of the top half section, the countering conductive patterns being located at a position that counters the feeding point at a predetermined interval.

2. The meander line antenna as claimed in claim 1, wherein
    out of said short circuit conductive patterns for coarse tuning, selected short circuit conductive patterns for coarse tuning are left intact while other short circuit conductive patterns for coarse tuning are removed, and
    out of said short circuit conductive patterns for fine tuning, a selected short circuit conductive pattern for fine tuning is left intact while other short circuit conductive patterns for fine tuning are removed.

3. A meander line antenna formed by folding a conductive pattern of a folded dipole antenna in the shape of a meander, having a basic structure comprising:
    a bottom half section consisting of a folded conductive pattern, and a feeding point arranged approximately at the center of the folded conductive pattern;
    a top half section consisting of a folded conductive pattern shaped like the bottom half section;
    a coarse tuning section consisting of a plurality of connection conductive patterns for coarse tuning that connect the bottom half section and the top half sections at a predetermined interval;
    a fine-tuning section consisting of a plurality of short circuit conductive patterns for fine tuning that connect countering conductive patterns of the top half section, the countering conductive patterns being located at a position that counters the feeding point at a predetermined interval.

4. The meander line antenna as claimed in claim 3, wherein
    out of said short circuit conductive patterns for coarse tuning, selected connection conductive patterns for coarse tuning are left intact while other short circuit conductive patterns for coarse tuning are removed, and
    out of said short circuit conductive patterns for fine tuning, a selected short circuit conductive pattern for fine tuning is left intact while other short circuit conductive patterns for fine tuning are removed.

5. A meander line antenna formed by folding a conductive pattern of a folded dipole antenna in the shape of a meander, having a basic structure comprising:
    a folded conductive pattern, and a feeding point arranged approximately at the center of the folded conductive pattern;
    a coarse tuning section consisting of a plurality of short circuit conductive patterns for coarse tuning that connect countering conductive patterns at a predetermined interval, wherein an interval between the countering conductive patterns immediately adjacent to the feeding point is set greater than an interval between other countering conductive patterns; and
    a fine-tuning section consisting of a plurality of short circuit conductive patterns for fine tuning that connect countering conductive patterns, the countering conductive patterns being located at a position that counters the feeding point, at a predetermined interval.

6. The meander line antenna as claimed in claim 5, wherein
    out of said short circuit conductive patterns for coarse tuning, selected short circuit conductive patterns for coarse tuning are left intact while other short circuit conductive patterns for coarse tuning are removed, and
    out of said short circuit conductive patterns for fine tuning, a selected short circuit conductive pattern for fine tuning is left intact while other short circuit conductive patterns for fine tuning are removed.

* * * * *